March 18, 1924.

J. R. W. MENGER ET AL

LOCK FOR AUTOMOBILE TIRE CHAINS

Filed March 29, 1922

1,487,258

INVENTORS
Joseph R. W. Menger
William L. Gass
By Frank H. Ashley
ATTORNEY

Patented Mar. 18, 1924.

1,487,258

UNITED STATES PATENT OFFICE.

JOSEPH R. W. MENGER AND WILLIAM L. GASS, OF NEW YORK, N. Y.; SAID GASS ASSIGNOR TO SAID MENGER.

LOCK FOR AUTOMOBILE TIRE CHAINS.

Application filed March 29, 1922. Serial No. 547,913.

*To all whom it may concern:*

Be it known that we, JOSEPH R. W. MENGER and WILLIAM L. GASS, citizens of the United States, residing at New York city, in the counties of Kings and New York, respectively, and State of New York, have invented certain new and useful Improvements in Locks for Automobile Tire Chains, of which the following is a specification.

Our invention relates to locks.

The object of our invention is to provide a lock adapted to hold the two ends of a chain in locked relation. The lock and chain may be used for securing a spare tire to the carrying frame of an automobile and was designed principally for such use.

Referring to the drawings which form a part of this specification,

A, indicates the body portion of the lock and is preferably made cylindrical in cross section as shown.

It is provided with a central bore B and a similar bore C of slightly greater diameter which provides a shoulder D at the adjacent ends of said bores, which serves as an abutment to position the portion E of the lock.

Figure 5:
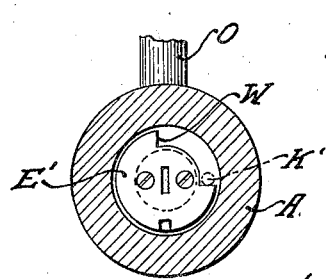
Figure 5 is a cross sectional view taken on line 5 of Figure 1.

Formed at a right angle to the bores B and C are three bores of relatively smaller diameter and indicated by F, G and H respectively, the upper ends of each of which is enlarged in diameter to form shoulders I—I—I respectively. Located in the bore B in close sliding rotatable relation is a locking cylinder J one end of which extends half-way across the bore G, and is cut away to form a semi-circular groove J' the diameter of which is slightly greater than that of the bore G. A pin K is carried by the cylinder J at one side thereof and extends across the semi-circular groove J', the end resting in alignment with the end of the cylinder, and its opposite end extending into the path of the rotating portion E' of the lock portion E, illustrated in Figure 5, and arranged to be moved with the cylinder J to turn the same one quarter of a revolution from its locked position shown in Figure 1 to its unlocked position shown in Figure 2 or vice versa. The outer cylindrical ring of the lock portion E is forced under pressure into the bore C and held by friction and also held by a pin L which extends through the casing or body portion A into an opening formed in cylinder E. The usual tumblers and key arrangements are used in the lock portion E and require no special description.

Figure 1:
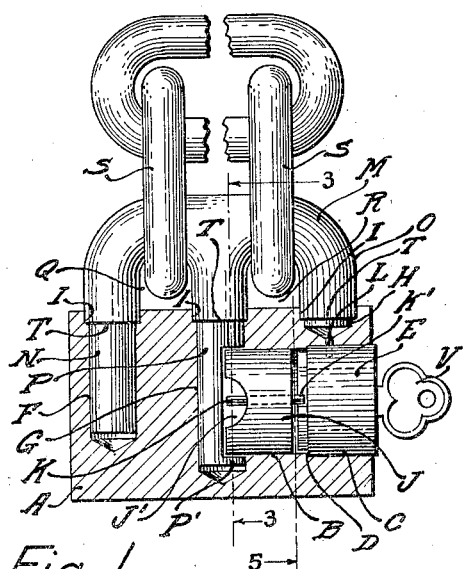
Figure 1 is a longitudinal view of the lock shown partly in section and with the bolt in locked position, and with the end links of the chain held by the bolt links.
Figure 3:
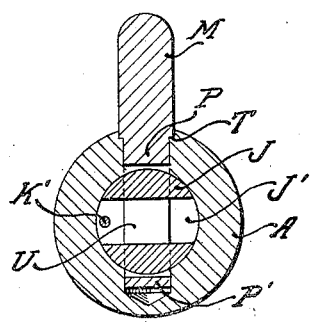
Figure 3 is a cross sectional view taken on line 3—3 of Figure 1.
Figure 4:
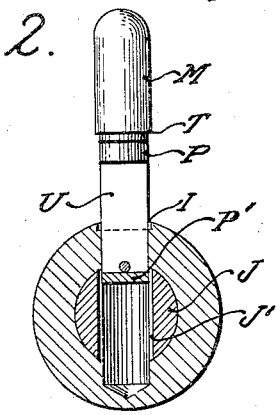
Figure 4 is a cross sectional view taken on line 4—4 of Figure 2.

The hasp or shackle portion of the lock is indicated by M and comprises three limbs N, O and P respectively joined together at their upper ends and forming two loops Q and R respectively, each of which holds the end link S of a chain, the diameter of the link of which practically fills the loop so that there is no room for an instrument to be inserted below the link, of sufficient strength, to force the bolt portion from the casing A when it is in locked relation therewith. The limbs N, O and P closely fit the bores F, G and H respectively, and are made greater in diameter at the points T—T—T respectively to form shoulders which rest on the shoulders I—I—I respectively of the casing, which insures accuracy in positioning the central limb P relative to the locking cylinder J. The limb P hereinafter referred to as the bolt, is cut away to the vertical median line on the side adjacent the cylinder B as indicated at U and to a distance corresponding to the diameter of said cylinder, and the lower end of the bolt P projects under the end of the cylinder B when in locked relation therewith, as illustrated in Figures 1 and 3, thus insuring great strength.

Figure 2:
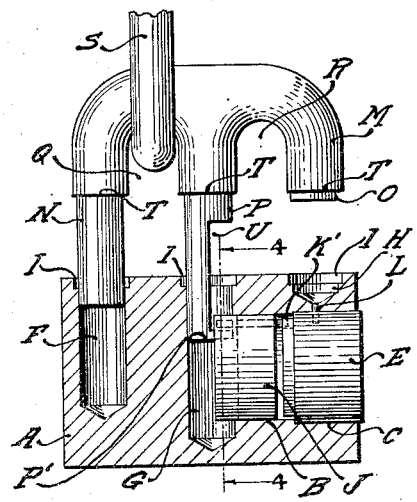
Figure 2 is a longitudinal view showing the bolt in its raised position.

The lock is operated as follows:

Assuming the lock to be in its open position as illustrated in Figure 2, the bolt portion P is pushed downward until the shoulders contact at the points T, the key V is turned one quarter of a revolution which turns the cylinder lock a corresponding distance by reason of the contact between the shoulder W and the end K' of the pin K, carrying the solid portion of the locking cylinder above the recessed end P' of the bolt P. To unlock, the movement is reversed, which brings the groove J' in proper position to permit the end P' of the bolt to slide upward until it strikes the pin K which prevents it from being entirely removed. It will be noted that the limb N is still within its bore thus holding one end of the chain while the other end only is released when the lock is open. It will also be noted that there are no projecting parts that would afford a purchase for a wrenching tool to pry the lock open.

I prefer to use hard tough steel or other suitable material for both the lock and chain to insure as far as possible against the same being bent or broken.

By reason of its cylindrical form the casing or body portion may be easily and evenly case hardened in manufacturing and the same will not be liable to crack.

Having thus described our invention, we claim as new:

1. A lock comprising a cylindrical body portion having a longitudinal bore and openings for the hasp extending into said body portion at right angles to said bore, a hasp the ends of which extend into said openings and forming two separated loops, one of which is always closed and one of which may be opened when the lock is in its unlocked and open condition.

2. A lock comprising a body portion having a longitudinal bore and openings of different lengths for the hasp extending into said body portions at right angles to said bore, a hasp the ends of which extend into said openings and forming two separated loops, one of which is always closed and one of which may be opened when the lock is in its unlocked and open condition.

3. A lock comprising a cylindrical body portion having a longitudinal bore and openings for the hasp extending into said body portion at right angles to said bore, one of which extends entirely across the same, a hasp the ends of which extend into said openings and form two separated loops, one of which is always closed and one of which may be opened when the lock is in its unlocked condition; said hasp having one member extending entirely across said bore and having a laterally extending projection at its lower end, and locking means located in said bore adapted to engage said lateral projection to hold the hasp in locked relation with the body portion.

4. A lock comprising a body portion having a longitudinal bore and openings for the hasp extending into said body portion at right angles to said bore, one of which extends entirely across the same, a hasp the ends of which extend into said openings and form two separated loops, one of which is always closed and one of which may be opened when the lock is in its unlocked condition; said hasp having one member extending entirely across said bore and having a laterally extending projection at its lower end, and rotatable locking means located in said bore adapted to engage said lateral projection to hold the hasp in locked relation with the body portion.

5. A lock comprising a cylindrical body portion having a longitudinal bore and openings for the hasp extending into said body portion at right angles to said bore, one of which extends entirely across the same, a hasp the ends of which extend into said openings and form two separated loops one of which is always closed and one of which may be opened when the lock is in its unlocked condition; said hasp having one member extending entirely across said bore and having a portion of its side cut away to form a lateral projection which rests below the lower side wall of the bore, when in locked position, and locking means comprising a rotatable cylinder one end of which extends into the space formed by the cut away portion of said hasp member and above said lateral projection, and having a slot formed on its end to permit said lateral projection to move upward across said bore.

6. A lock comprising a body portion having a longitudinal bore and openings for the hasp extending into said body portion at right angles to said bore, one of which extends entirely across the same, a hasp the ends of which extend into said openings and form two separated loops, one of which is always closed and one of which may be opened when the lock is in its unlocked condition; said hasp having one member extending entirely across said bore and having a portion of its side cut away to form a lateral projection which rests below the lower side wall of the bore when in locked position, and locking means comprising a cylinder one end of which extends into the space formed by the cut away portion of said hasp member.

7. A lock comprising a cylindrical body portion having a longitudinal bore, and openings for the hasp extending into said body portion at right angles to said bore, each having an annular shoulder formed near its upper end, a hasp which rests on said shoulders the ends of which extend into said openings, and locking means located in said bore adapted to engage and hold said hasp to said body portion.

8. A lock comprising a body portion having a longitudinal bore and openings for the hasp extending into said body portion at right angles to said bore, one of which extends entirely across the same, a hasp the ends of which extend into said openings and form two separated loops, one of which is always closed and one of which may be opened when the lock is in its unlocked condition; said hasp having one member extending entirely across said bore and having a portion of its side cut away to form a lateral projection which rests below the lower side wall of the bore, and locking means comprising a rotatable cylinder one end of which extends into the space formed by the cut away portion of said hasp member and above said lateral projection, and having a slot formed on its end to permit said lateral projection to move upward across said bore, and means carried by said rotatable cylinder to limit the upward movement of said hasp member.

9. A lock comprising a body portion having an opening for a hasp member, a bore perpendicular thereto, a rotatable locking member in the bore, means to prevent the hasp from turning relative to the body portion and means carried by the locking member to prevent the hasp from being withdrawn from the body.

10. A lock comprising a body portion having an opening for a hasp member, a bore perpendicular thereto, a rotatable locking member in the bore, means to prevent the hasp from turning relative to the body portion and a pin carried by the locking member to prevent the hasp from being withdrawn from the body.

11. A lock comprising a body portion having an opening for a hasp member, and a bore perpendicular thereto, a rotatable locking member in the bore and having a groove in its inner face, a pin carried by the locking member and located near one end of the groove, a lug carried by the hasp member and adapted to coact with said pin and serving as a means to prevent the removal of the hasp from the body.

12. A lock comprising a body portion having an opening for a hasp member, a bore perpendicular thereto, a rotatable locking member in the bore, said member comprising two relatively rotatable parts, shoulders on the inner face of one of these parts and means on the other part engageable by the shoulders whereby the second part may be rotated by the first, said rotatable locking member having a groove in its inner face, means carried by the locking member and located near one end of the groove and means carried by the hasp adapted to engage said means carried by the locking member whereby the removal of the hasp from the body is prevented.

13. A lock comprising a body portion having an opening for a hasp member, a bore in angular relation therewith, a locking member in the bore and having a groove in its inner surface, said locking member being composed of two relatively movable parts, shoulders on the inner surface of one of these parts and means on the other part engageable by the shoulders whereby the second part may be moved by the first, and means carried by the hasp adapted to coact with means carried by the locking member whereby the removal of the hasp from the body is prevented.

Signed at New York city, in the county of New York and State of N. Y., this 28th day of January A. D. 1922.

JOSEPH R. W. MENGER.
WILLIAM L. GASS.

Witness:
J. S. LIBIEN.